(12) United States Patent
Setomoto

(10) Patent No.: US 10,187,960 B2
(45) Date of Patent: Jan. 22, 2019

(54) LIGHTING SYSTEM HAVING CONTROLLER THAT DOES NOT CAUSE PLURALITY OF LUMINAIRES TO EMIT LIGHT WITH PREDETERMINED BRIGHTNESS OR ACTIVATE CAMERA WHEN THE SOUND COLLECTED BY SOUND COLLECTOR IS DETERMINED NOT TO BE THE SOUND FROM THE PREDETERMINED DIRECTION

(71) Applicant: Panasonic Intellectual Property Management Co., Ltd., Osaka (JP)

(72) Inventor: Tatsumi Setomoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 111 days.

(21) Appl. No.: 15/453,256

(22) Filed: Mar. 8, 2017

(65) Prior Publication Data

US 2017/0265280 A1    Sep. 14, 2017

(30) Foreign Application Priority Data

Mar. 9, 2016 (JP) .................................. 2016-046234

(51) Int. Cl.
*H05B 37/02* (2006.01)
*F21V 23/04* (2006.01)
*F21V 21/14* (2006.01)

(52) U.S. Cl.
CPC .......... *H05B 37/0236* (2013.01); *F21V 21/14* (2013.01); *F21V 23/0442* (2013.01);
(Continued)

(58) Field of Classification Search
CPC ............ H05B 37/0236; H05B 37/0227; F21V 23/0442; F21V 23/0471; F21V 23/0478; F21V 21/14; Y02B 20/40
See application file for complete search history.

(56) References Cited

U.S. PATENT DOCUMENTS 9,572,233 B1 *    2/2017    Moore ............... H05B 37/0227
2007/0279494 A1 *  12/2007    Aman .................. G01S 3/7864
                                              348/169
(Continued)

FOREIGN PATENT DOCUMENTS

JP         2002-289371 A      10/2002
JP         2003-219354 A      7/2003
(Continued)

*Primary Examiner* — Alan B Cariaso
(74) *Attorney, Agent, or Firm* — McDermott Will & Emery LLP

(57) ABSTRACT

A lighting system includes: a plurality of luminaires; a camera which captures an image of an area illuminated by the plurality of luminaires; a sound collector including at least two microphones; and a controller which determines whether or not a sound collected by the sound collector while the plurality of luminaires are off is a sound from a predetermined direction relative to the sound collector. The controller causes at least one of the plurality of luminaires to emit light of a predetermined brightness and activates the camera when the sound collected by the sound collector is determined to be the sound from the predetermined direction, and does not cause the plurality of luminaires to emit light of the predetermined brightness or activate the camera when the sound collected by the sound collector is determined not to be the sound from the predetermined direction.

8 Claims, 9 Drawing Sheets

(52) U.S. Cl.
CPC ...... *F21V 23/0471* (2013.01); *F21V 23/0478* (2013.01); *H05B 37/0227* (2013.01); *Y02B 20/40* (2013.01)

(56) References Cited

U.S. PATENT DOCUMENTS

2016/0261824 A1* 9/2016 Scalisi .................. H04N 7/142
2017/0061953 A1* 3/2017 An ......................... G06F 1/163

FOREIGN PATENT DOCUMENTS

| | | | |
|---|---|---|---|
| JP | 2009-101056 | A | 5/2009 |
| JP | 2010-206713 | A | 9/2010 |
| JP | 2011-009066 | A | 1/2011 |
| JP | 2014-998573 | A | 5/2014 |

* cited by examiner

LIGHTING SYSTEM HAVING
CONTROLLER THAT DOES NOT CAUSE
PLURALITY OF LUMINAIRES TO EMIT
LIGHT WITH PREDETERMINED
BRIGHTNESS OR ACTIVATE CAMERA
WHEN THE SOUND COLLECTED BY
SOUND COLLECTOR IS DETERMINED NOT
TO BE THE SOUND FROM THE
PREDETERMINED DIRECTION

CROSS REFERENCE TO RELATED
APPLICATION

This application claims the benefit of priority of Japanese Patent Application Number 2016-046234 filed on Mar. 9, 2016, the entire content of which is hereby incorporated by reference.

BACKGROUND

1. Technical Field

The present disclosure relates to a lighting system which turns on or off a luminaire according to presence or absence of a person.

2. Description of the Related Art

Conventionally, for example, a lighting system which is installed in an office, business premises, a warehouse, a factory, etc. operates to turn off all of luminaires when everyone leaves. However, when a person enters a dark room in a state in which all of the luminaires are off during night-time, it is difficult for the person to turn on the luminaires, causing inconvenience for the person.

In view of the above, a lighting system in which a camera is disposed in an area illuminated by a luminaire, and the luminaire is turned on when the camera detects presence of a person in a room. Japanese Unexamined Patent Application Publication No. 2010-206713 discloses a technique related to such a lighting system.

SUMMARY

However, with the above-described lighting system, the camera needs light of the luminaire for image capturing, and thus the luminaire cannot be completely turned off even when everyone has left the room, posing a problem that it is difficult to reduce power consumption.

In view of the above, an object of the present disclosure is to provide a lighting system which allows power saving in a system in which a luminaire is turned on or off according to presence or absence of a person in an image captured by a camera.

A lighting system according to an aspect of the present disclosure includes: a plurality of luminaires; a camera which captures an image of an area illuminated by the plurality of luminaires; a sound collector including at least two microphones; and a controller which determines whether or not a sound collected by the sound collector while the plurality of luminaires are off is a sound from a predetermined direction relative to the sound collector. In the lighting system, the controller causes at least one of the plurality of luminaires to emit light of a predetermined brightness and activates the camera when the sound collected by the sound collector is determined to be the sound from the predetermined direction, and does not cause the plurality of luminaires to emit light of the predetermined brightness or activate the camera when the sound collected by the sound collector is determined not to be the sound from the predetermined direction.

With the lighting system according to an aspect of the present disclosure, it is possible to save power in a system in which a luminaire is turned on or off according to presence or absence of a person in an image captured by a camera.

BRIEF DESCRIPTION OF DRAWINGS

The figures depict one or more implementations in accordance with the present teaching, by way of examples only, not by way of limitations. In the figures, like reference numerals refer to the same or similar elements.

Figure 1:
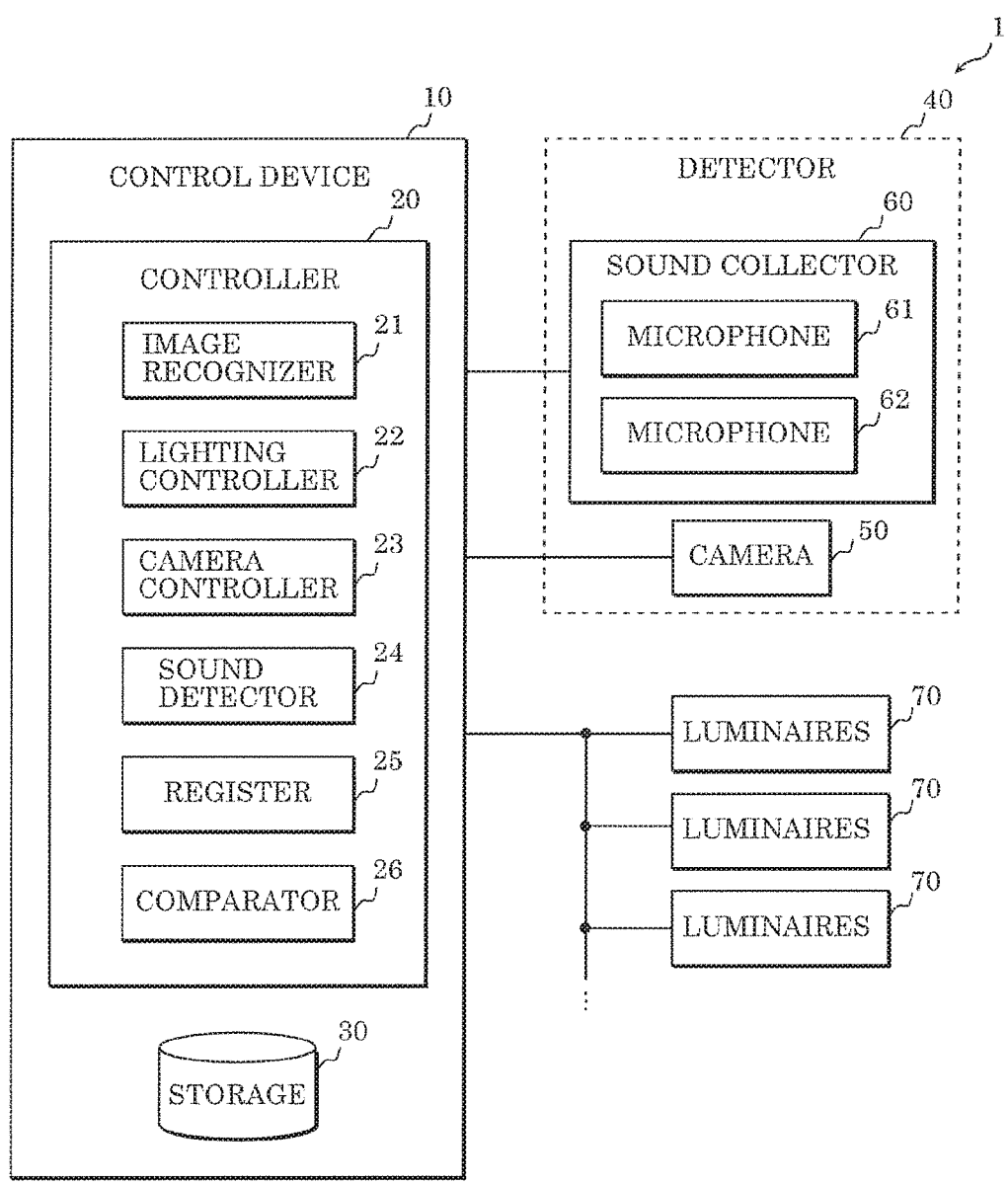
FIG. 1 is a configuration diagram illustrating an example of lighting system 1 according to Embodiment 1.

DETAILED DESCRIPTION OF THE
EMBODIMENTS

The following describes in detail embodiments according to the present disclosure, with reference to the drawings. It should be noted that the subsequently-described embodiments show specific examples of the present disclosure. Thus, the numerical values, shapes, materials, structural components, the disposition and connection of the structural components, steps, the processing order of the steps, etc. described in the following embodiments are mere examples, and do not intend to limit the present disclosure. Furthermore, among the structural components in the following embodiments, components not recited in the independent claim which indicates the broadest concept of the present disclosure are described as arbitrary structural components.

In addition, each diagram is a schematic diagram and not necessarily strictly illustrated. Additionally, the same structural components share the same reference numerals in each diagram.

Embodiment 1

The following describes Embodiment 1 with reference to FIG. 1 to FIG. 6.

[A Configuration of a Lighting System]

FIG. 1 is a configuration diagram illustrating an example of lighting system 1 according to Embodiment 1.

Lighting system 1 includes control device 10, detector 40, and a plurality of luminaires 70. Lighting system 1 is a lighting system which turns on, among the plurality of luminaires 70, luminaire 70 which corresponds to a location at which a person is present, and turns off, among the plurality of luminaires 70, luminaire 70 which corresponds to a location at which a person is not present, according to presence or absence of a person in an area illuminated by the plurality of luminaires 70. Control device 10 is, for example, a personal computer (PC), a terminal device (a smartphone, a tablet terminal, or a remote controller), or the like, and communicates with detector 40 and luminaires 70. According to the embodiment, control device 10 is a PC, and further communicates with a terminal device such as a tablet terminal.

Detector 40 is a device which, for example, is formed of a single casing including camera 50 and sound collector 60. Here, detector 40 shall be described with reference to FIG. 2A and FIG. 2B.

Figure 2A:
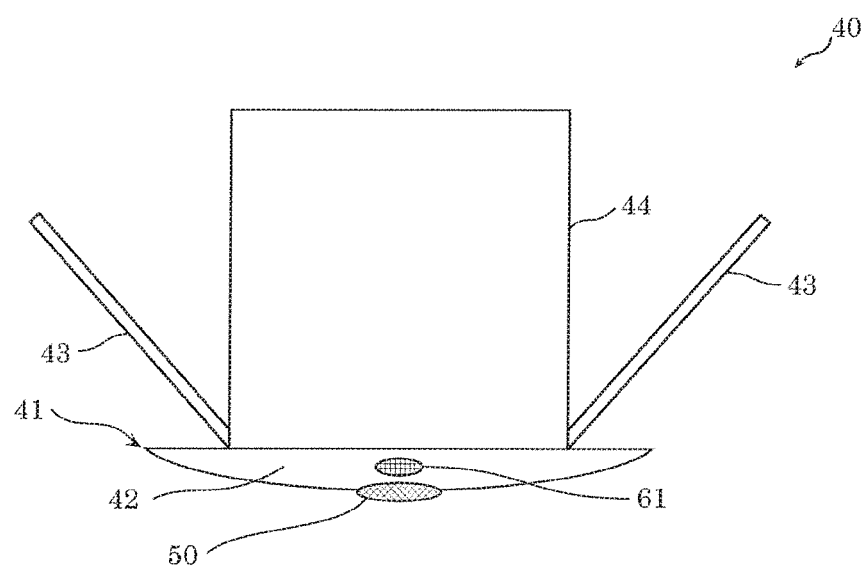
FIG. 2A is a side view illustrating a detector according to Embodiment 1.

FIG. 2A is a side view illustrating detector 40 according to Embodiment 1.

Figure 2B:
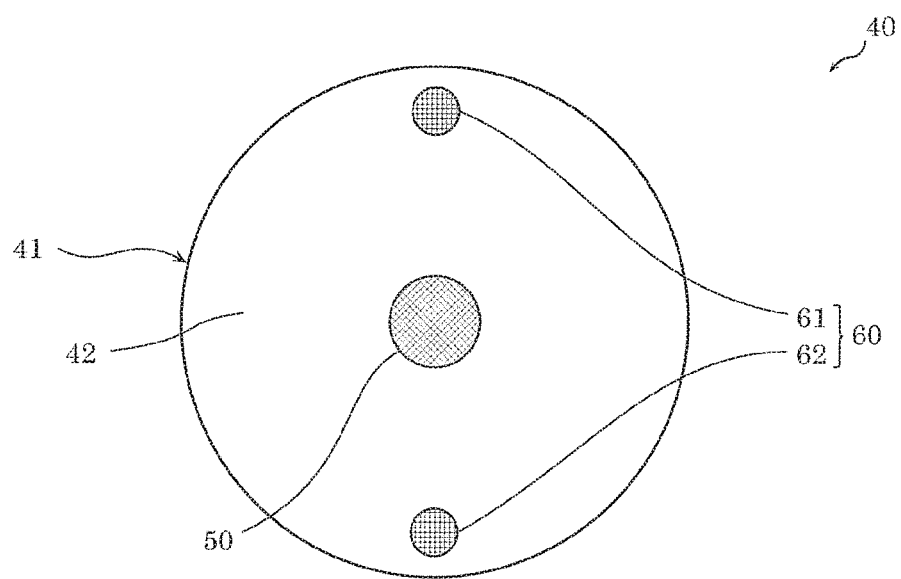
FIG. 2B is a front view illustrating the detector according to Embodiment 1.

FIG. 2B is a front view illustrating detector 40 according to Embodiment 1.

As described above, detector 40 is formed of a single casing 41. Casing 41 includes exposure surface 42, attaching component 43, and main body 44. Exposure surface 42 is a surface which is exposed from a ceiling when detector 40 is attached to the ceiling. Camera 50 and sound collector 60 are disposed on exposure surface 42. Attaching component 43 is an attachment spring for fixing detector 40 to the ceiling. More specifically, a portion of detector 40 is recessed in a ceiling in a state in which attaching component 43 is elastically deformed upward along main body 44 as illustrated in FIG. 2A, and the ceiling is sandwiched between attaching component 43 and exposure surface 42 when attaching component 43 is elastically restored, thereby fixing detector 40 to the ceiling. Main body 44 houses a circuit for driving camera 50 and sound collector 60, and protects the circuit.

Figure 3:
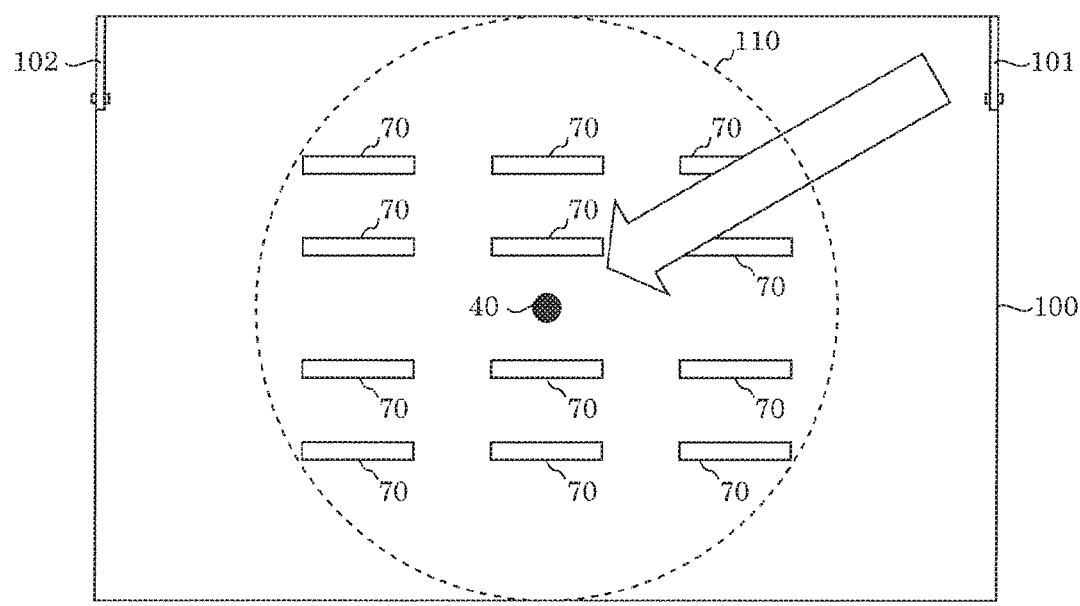
FIG. 3 is a diagram illustrating a state in which the detector according to Embodiment 1 is installed.

As illustrated in FIG. 3, detector 40 is installed on a ceiling in space 100 (a room) in which a plurality of luminaires 70 are installed (i.e., in which lighting system 1 is installed).

FIG. 3 is a diagram illustrating a state in which detector 40 according to Embodiment 1 is installed. FIG. 3 is a diagram illustrating space 100 viewed from a ceiling side, and detector 40 and a plurality of luminaires 70 installed on the ceiling. Detector 40 is, for example, installed at the center of the ceiling in space 100. In FIG. 3, area 110 illuminated by the plurality of luminaires 70 is illustrated. Furthermore, doors 101 and 102 each of which is a region of at least one of an entrance and an exit for people in space 100 are illustrated in FIG. 3. Doors 101 and 102 are hinged doors, for example. However, doors 101 and 102 may be sliding doors, or the like. It should be noted that area 110 illuminated by the plurality of luminaires 70 may extend over the entirety of space 100.

Camera 50 is a camera in which a solid-state imaging device such as a CCD, a CMOS, etc. is used, and captures an image of area 110 illuminated by the plurality of luminaires 70. Camera 50 is, for example, a wide-angle camera (i.e., a camera capable of capturing a 360-degree image) for capturing an image of a wide range in space 100. Detector 40 including camera 50 is installed at the center of the ceiling in space 100, enabling camera 50 to capture an image of a wide range in space 100. As illustrated in FIG. 2A and FIG. 2B, camera 50 is disposed at the center of exposure surface 42. The image of area 110 captured by camera 50 is transmitted to control device 10.

Sound collector 60 includes at least two microphones 61 and 62. Microphones 61 and 62 are, for example, omnidirectional microphones. Microphones 61 and 62 are disposed at different locations in casing 41. More specifically, as illustrated in FIG. 2B, microphones 61 and 62 are placed at a distance from each other on exposure surface 42. With this configuration, a sound from a single sound source reaches microphone 61 and microphone 62 with a time lag when a distance between the sound source and microphone 61 differs from a distance between the sound source and microphone 62.

Control device 10 is a device for controlling detector 40 and the plurality of luminaires 70, and includes controller 20 and storage 30.

Controller 20 controls, for example, activating or deactivating of camera 50 and turning on or off of the plurality of luminaires 70 on the basis of information obtained by detector 40. Controller 20 includes image recognizer 21, lighting controller 22, camera controller 23, sound detector 24, register 25, and comparator 26, as functional structural components. Controller 20 is implemented by a processor or the like which executes a control program stored in storage 30. However, controller 20 may be implemented by a microcomputer, a dedicated circuit, or the like.

Image recognizer 21 (controller 20) determines presence or absence of a person in area 110 on the basis of the image of area 110 captured by camera 50. Image recognizer 21 is capable of determining presence or absence of a person in area 110 by performing image recognition on the image. It should be noted that, since the image of area 110 captured by camera 50 needs to be an image in which presence or absence of a person can be determined, camera 50 needs light to a certain degree depending on performance of camera 50. More specifically, camera 50 needs light emitted by the plurality of luminaires 70 for capturing an image of area 110 when space 100 is a space which no outside light enters, or at night, for example.

Lighting controller 22 (controller 20) controls, for example, turning on or off of the plurality of luminaires 70 according to a result of detection of presence or absence of a person in area 110 by image recognizer 21. For example, lighting controller 22 turns on luminaire 70 corresponding to a place in which a person is present in area 110, and turns off luminaire 70 corresponding to a place in which a person is absent in area 110. More specifically, when image recognizer 21 determines absence of a person in an upper-right region of area 110 illustrated in FIG. 3, lighting controller 22 turns off luminaire 70 which illuminates the upper-right region. When image recognizer 21 detects presence of a person in a lower-left region of area 110 illustrated in FIG. 3, lighting controller 22 turns on luminaire 70 which illuminates the lower-left region. When image recognizer 21 detects no person in area 110 illustrated in FIG. 3, lighting controller 22 turns off all of luminaires 70 which illuminate area 110. In addition, although the details will be given later, when a sound collected by sound collector 60 while the plurality of luminaires 70 which illuminate area 110 are off is determined to be a sound from a predetermined direction, lighting controller 22 causes the plurality of luminaires 70 to emit light of a predetermined brightness.

Camera controller 23 (controller 20) controls, for example, activating or deactivating of camera 50 according to a result of detection of presence or absence of a person in area 110 by image recognizer 21. For example, when image recognizer 21 detects no person in area 110 illustrated in FIG. 3, camera controller 23 deactivates camera 50. In addition, although the details will be given later, when a sound collected by sound collector 60 while the plurality of luminaires 70 which illuminate area 110 are off is determined to be a sound from a predetermined direction, camera controller 23 activates camera 50.

Sound detector 24 detects a direction of the sound collected by sound collector 60. As described above, sound collector 60 includes at least two microphones 61 and 62, and thus sound detector 24 is capable of detecting a direction of a sound collected by sound collector 60. Although description will not be given in detail here, sound detector 24 detects a direction of the sound collected by sound collector 60 on the basis of, for example, a difference between arrival times of a sound from a single sound source at microphones 61 and 62. For example, when a sound is generated in proximity to door 101 illustrated in FIG. 3, sound detector 24 determines that the sound is a sound from a direction of door 101. FIG. 3 schematically illustrates the sound from a direction of door 101 using an arrow.

Register 25 registers the sound collected by sound collector 60. More specifically, register 25 registers a type of the sound collected by sound collector 60. To register a type of a sound by register 25 means that register 25 stores a data item indicating a type of a sound in advance on storage 30. The data item indicating a type of a sound is, for example, an analog data item of a sound, a digital data item resulting from digitalizing the analog data item, etc. In addition, register 25 registers the direction of the sound collected by sound collector 60. The direction of the sound is relative to sound collector 60 and detected by sound detector 24. To register a direction of a sound by register 25 means that register 25 stores a data item indicating a direction of a sound in advance on storage 30. The data item indicating a direction of a sound is, for example, a data item of a direction centered at detector 40 (sound collector 60). Here, the data item indicating a type of a sound and the data item indicating a direction of a sound both of which are stored in advance by register 25 on storage 30 are also collectively referred to as a sound data item. Details of operation performed by register 25 will be described later with reference to FIG. 4 and FIG. 5.

Comparator 26 compares the sound collected by sound collector 60 and the sound registered by register 25. Details of operation performed by comparator 26 will be described later with reference to FIG. 6.

Storage 30 is a semiconductor memory such as a read only memory (ROM) in which a program and data items are stored, a random access memory (RAM) for use in storing of data items or the like in executing a program, etc. Storage 30 stores in advance the sound data item collected by sound collector 60, via register 25. Register 25 communicates with a terminal device such as a tablet terminal when registering a sound.

The plurality of luminaires 70 are installed on the ceiling or the like in space 100 and controlled by control device 10. The plurality of luminaires 70 illuminate area 110. Luminaires 70 each include a light source such as a light emitting diode (LED) or a fluorescent lamp, and a power supply circuit for driving the light source. Control device 10 controls the power supply circuit, thereby controlling turning on or off, and the like, of the light source.

[An Operation of the Lighting System]

Next, an operation performed by lighting system 1 will be described with reference to FIG. 4 to FIG. 6.

First, an operation performed when register 25 stores in advance a sound data item on storage 30 will be described with reference to FIG. 4 and FIG. 5

Figure 4:
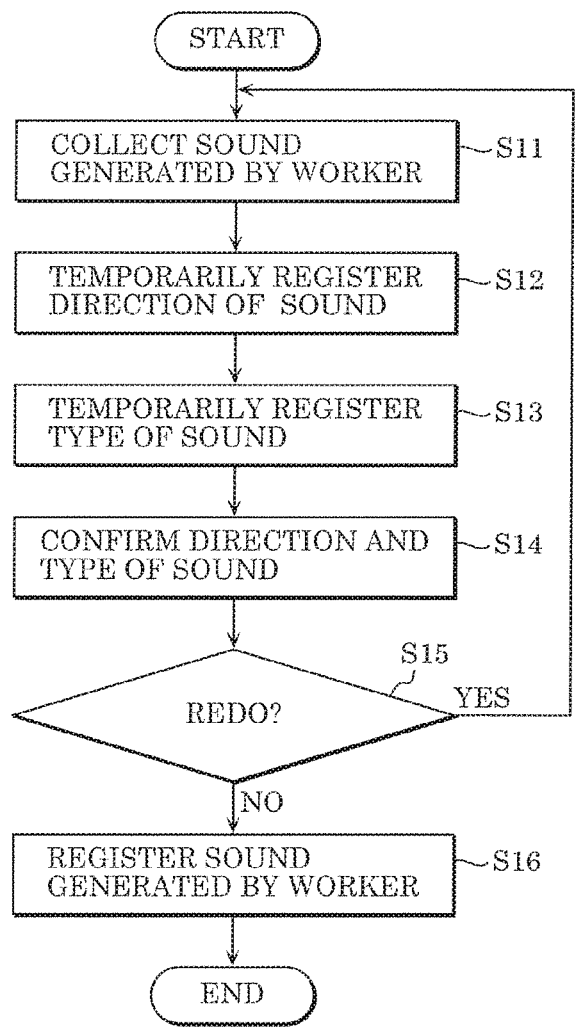
FIG. 4 is a flowchart illustrating an example of an operation performed when the lighting system according to Embodiment 1 stores a sound of a predetermined type from a predetermined direction.

FIG. 4 is a flowchart illustrating an example of an operation performed when lighting system 1 according to Embodiment 1 registers a sound of a predetermined type from a predetermined direction.

First, sound collector 60 collects a sound generated by a worker (Step S11.) The worker generates a sound of a predetermined type from a predetermined direction. The predetermined direction is a direction toward a region of at least one of an entrance and an exit for people in space 100 in which lighting system 1 is installed, relative to sound collector 60. Here, the predetermined direction is, for example, a direction of door 101. The sound of a predetermined type is, for example, a sound generated when door 101 is opened or closed, a footstep, etc. The sound generated when door 101 is opened or closed includes, for example, a sound of unlocking door 101, a sound of turning a doorknob of door 101, a creaking sound of a hinge generated when door 101 is opened or closed, an impact sound when door 101 is closed, etc. It should be noted that, when door 101 is a sliding door, the sound generated when door 101 is opened or closed includes, for example, a sound of door 101 scraping with a groove, a rail, etc. when door 101 is opened or closed, instead of the creaking sound of a hinge generated when door 101 is opened or closed.

Next, sound detector 24 detects a direction of the sound generated by the worker, and register 25 temporarily registers the direction of the sound detected by sound detector 24 (Step S12). For example, register 25 temporarily stores on storage 30 a data item indicating the direction of door 101 as a data item indicating the direction of the sound.

In addition, register 25 temporarily registers a type of the sound generated by the worker (Step S13). For example, register 25 temporarily stores on storage 30 a data item indicating a sound generated when door 101 is opened or closed as a data item indicating a type of the sound.

It should be noted that the order of Step S12 and Step S13 illustrated in FIG. 4 is an example, and Step S13 and Step S12 may be performed in this order. In other words, register 25 may temporarily register the direction of a sound after temporarily registering the type of the sound.

Next, register 25 urges the worker to confirm the direction and the type of the sound which have been temporarily registered (Step S14). Register 25 communicates with a terminal device such as a tablet terminal when registering a sound. Register 25 causes the tablet terminal or the like to display an image on a display section as illustrated in FIG. 5, for example.

Figure 5:
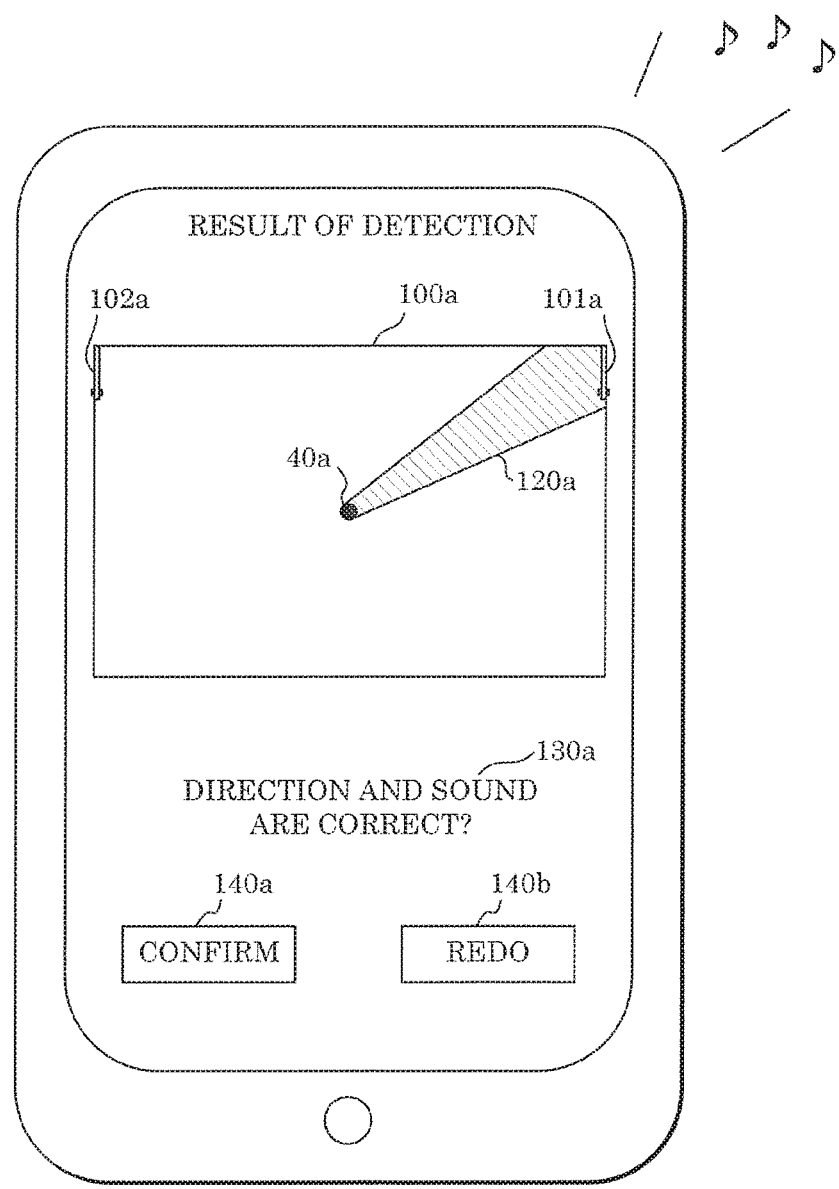
FIG. 5 is a diagram illustrating an example of a display image which a register according to Embodiment 1 causes a tablet terminal to display.

FIG. 5 is a diagram illustrating an example of the image which register 25 according to Embodiment 1 causes the tablet terminal to display.

As illustrated in FIG. 5, the display section of the tablet terminal displays image 100a which indicates space 100. Image 100a includes an image for making it easier for the worker to recognize the direction in space 100. For example, image 101a and 102a indicating doors 101 and 102 are displayed at positions in image 100a which correspond to positions of doors 101 and 102 in space 100. In addition, image 40a indicating detector 40 is displayed at a position in image 100a which corresponds to a position of detector 40 in space 100. It should be noted that image 100a may include images indicating a desk, a window, luminaires 70, etc., placed in space 100.

Register 25 superimposes, on image 100a, image 120a indicating the direction of the sound generated by the worker as illustrated in FIG. 5, as a result of temporarily registering the direction of door 101 as the direction of the sound generated by the worker. Image 120a as displayed extends from a position of image 101a to a position of image 40a, and thus it is possible for the worker to recognize that the data item indicating a direction of a sound to be stored on storage 30 by register 25 is the data item indicating the direction of door 101.

Furthermore, register 25 causes a speaker of the tablet terminal to reproduce the sound generated by the worker, as a result of temporarily registering the sound generated when door 101 is opened or closed as the type of the sound generated by the worker. With this, it is possible for the worker to recognize that the data item indicating a type of a sound to be stored on storage 30 by register 25 is the data item indicating the sound generated when door 101 is opened or closed.

In this manner, register 25 causes the worker to confirm the direction and the type of the sound which has been generated by the worker.

Next, register 25 determines whether or not to redo registering of the sound generated by the worker (Step S15). Register 25 displays, on the display section of the tablet terminal, for example, display image 130a used for confirming that the direction and type of the sound to be registered by register 25 are the direction of image 120a and the sound being reproduced, and icons 140 and 140b which can be operated by the worker, as illustrated in FIG. 5. When the worker operates (taps, for example) icon 140b which indicates "redo", for example, register 25 determines to redo registering of the sound generated by the worker. When the worker operates icon 140a which indicates "confirm", for example, register 25 determines not to redo registering of the sound generated by the worker.

When register 25 determines to redo registering of the sound generated by the worker, processes from Step S11 to Step S14 are performed again. For example, registering of the sound is redone when the direction of the sound (the direction of door 101) is temporarily registered as a direction different from a direction expected by the worker, due to a noise mixed with the sound generated by the worker (the sound generated when door 101 is opened or closed) or reflection of the sound generated by the worker in space 100. At this time, the data item indicating the direction of the sound generated by the worker and the data item indicating the type of the sound generated by the worker which are temporarily stored on storage 30 are deleted, for example.

On the other hand, when register 25 determines not to redo registering of the sound generated by the worker, register 25 registers the sound generated by the worker which has been temporarily registered (Step S16). More specifically, register 25 maintains, without deleting, the data item indicating the direction of the sound generated by the worker and the data item indicating the type of the sound generated by the worker which are temporarily stored on storage 30 to be stored in storage 30.

As described above, a sound from a predetermined direction (the direction of door 101) and of a predetermined type (the sound generated when door 101 is opened or closed) is registered. It should be noted that register 25 may register a plurality of sounds. For example, register 25 may register a sound from a different direction (a direction of door 102, for example) in addition to the sound which is from the direction of door 101 and is generated when door 101 is opened or closed.

Next, a normal operation performed by lighting system 1 after registering of the sound of a predetermined type from a predetermined direction is completed will be described with reference to FIG. 6.

Figure 6:
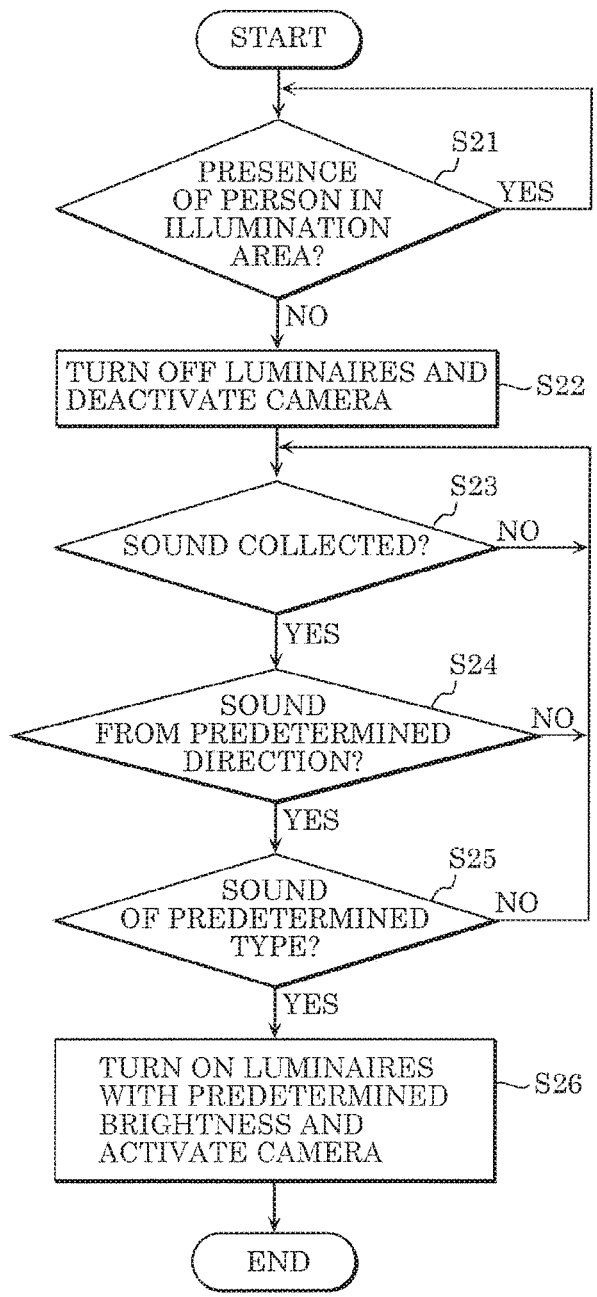
FIG. 6 is a flowchart illustrating an example of an operation of the lighting system according to Embodiment 1.

FIG. 6 is a flowchart illustrating an example of an operation of lighting system 1 according to Embodiment 1. It should be noted that the plurality of luminaires 70 are assumed to be on and camera 50 is assumed to be activated at the start of the operation of lighting system 1 illustrated in FIG. 6.

First, image recognizer 21 determines presence or absence of a person in area 110 from the image of area 110 captured by camera 50 (Step S21). More specifically, image recognizer 21 performs image recognition on the image of area 110 captured by camera 50, thereby determining whether or not a person is present in area 110.

When image recognizer 21 determines that a person is present in area 110 (Yes in Step S21), lighting controller 22 repeats the operation of Step S21 until it is determined that there is no person in area 110.

When image recognizer 21 determines that a person is absent in area 110 (No in Step S21), lighting controller 22 turns off all of luminaires 70 and camera controller 23 deactivates camera 50 (Step S22). For example, after the elapse of a predetermined period of time (e.g., one minute) subsequent to the determination, by image recognizer 21, that a person is absent in area 110, lighting controller 22 turns off all of luminaires 70 and camera controller 23 deactivates camera 50.

Next, comparator 26 determines whether or not sound collector 60 has collected a sound (Step S23).

When comparator 26 determines that sound collector 60 has not collected a sound (No in Step S23), the process of Step S23 is repeated. When everyone has left space 100 and space 100 is in a quiet state in which, for example, the noise is at a level less than or equal to a predetermined threshold, comparator 26 determines that sound collector 60 has not collected a sound.

On the other hand, when comparator 26 determines that sound collector 60 has collected a sound (Yes in Step S23), comparator 26 (controller 20) determines whether or not the sound collected by sound collector 60 while the plurality of luminaire 70 are off is a sound from a predetermined direction (Step S24). For example, comparator 26 determines whether or not the sound collected by sound collector 60 is a sound from the predetermined direction, by comparing a direction of the sound registered by register 25 (the predetermined direction) and a direction of the sound collected by sound collector 60. When the direction of the sound registered by register 25 and the direction of the sound collected by sound collector 60 approximately match, comparator 26 determines that the sound collected by sound collector 60 is the sound from the predetermined direction. What is intended by approximately matching includes the case where it is recognized that the directions substantially match, in addition to completely matching.

When comparator 26 determines that the sound collected by sound collector 60 is not the sound from the predetermined direction (No in Step S24), the processes from Step S23 are repeated. More specifically, lighting controller 22 does not cause luminaires 70 to emit light of the predetermined brightness, and camera controller 23 does not activate camera 50.

On the other hand, when compactor 26 determines that the sound collected by sound collector 60 is the sound from the predetermined direction (Yes in Step S24), comparator 26 determines whether or not the sound collected by sound collector 60 is the sound of the predetermined type (Step S25). For example, comparator 26 determines whether or not the sound collected by sound collector 60 is the sound of the predetermined type, by comparing the type of the sound registered by register 25 (predetermined type) and the type of the sound collected by sound collector 60. For example, when the type of the sound registered by register 25 and the type of the sound collected by sound collector 60 approximately match, comparator 26 determines that the sound collected by sound collector 60 is the sound of the predetermined type.

It should be noted that the order of Step S24 and Step S25 illustrated in FIG. 6 is an example, and Step S25 and Step S24 may be performed in this order.

When comparator 26 determines that the sound collected by sound collector 60 is not the sound of the predetermined type (No in Step S25), the processes from Step S23 are repeated.

On the other hand, when comparator 26 determines that the sound collected by sound collector 60 is the sound of the predetermined type (Yes in Step S25), lighting controller 22 causes luminaires 70 to emit light of a predetermined brightness and camera controller 23 activates camera 50 (Step S26). The predetermined brightness is brightness necessary for capturing, by camera 50, an image in which presence or absence of a person in area 110 can be determined. It should be noted that, at this time, lighting controller 22 may cause at least one of luminaires 70 disposed in a predetermined direction relative to sound collector 60 among the plurality of luminaires 70, to emit light of a predetermined brightness. For example, when sound collector 60 collects a sound from the direction of door 101 as a predetermined direction, lighting controller 22 causes luminaire 70 disposed in the direction of door 101 relative to sound collector 60 (luminaire 70 disposed at an upper-right region of area 110 illustrated in FIG. 3) to emit light of a predetermined brightness.

As described above, controller 20 turns on the plurality of luminaires 70 to emit light of a predetermined brightness and activates camera 50 when the sound collected by sound collector 60 while luminaires 70 are off is a sound of a predetermined type from the predetermined direction. Subsequently, image recognizer 21 determines presence or absence of a person in area 110 on the basis of the image of area 110 captured by camera 50, and lighting controller 22 controls, for example, turning on or off of the plurality of luminaires 70 according to a result of detection of presence or absence of a person in area 110 by image recognizer 21. For example, lighting controller 22 turns on luminaire 70 corresponding to a place in which a person is present in area 110, and turns off luminaire 70 corresponding to a place in which a person in absent in area 110.

[Advantageous Effects, Etc.]

With the conventional lighting systems, a camera needs light of a luminaire for image capturing, and thus the luminaire cannot be completely turned off even when everyone has left the room, posing a problem that it is difficult to reduce power consumption.

In view of the above, lighting system 1 according to the present embodiment includes a plurality of luminaires 70, camera 50 which captures an area illuminated by the plurality of luminaires 70, and sound collector 60 including at least two microphones 61 and 62. In addition, lighting system 1 includes controller 20 which determines whether or not a sound collected by sound collector 60 while the plurality of luminaires 70 are off is a sound from a predetermined direction relative to sound collector 60. When controller 20 determines that the sound collected by sound collector 60 is the sound from the predetermined direction, controller 20 causes at least one of the plurality of luminaires 70 to emit light of a predetermined brightness and activates camera 50. When controller 20 determines that the sound collected by sound collector 60 is not the sound from the predetermined direction, controller 20 does not cause the plurality of luminaires 70 to emit light of the predetermined brightness or activate camera 50.

In this manner, the plurality of luminaires 70 are caused to emit light of a brightness, as the predetermined brightness, necessary for capturing, by camera 50, an image in which presence or absence of a person can be determined, as a result of collecting, by sound collector 60, of a sound from the direction of the region of at least one of an entrance and an exit in space 100, for example, as the predetermined direction. In other words, since it is known in advance that a person is moving to area 110, as a result of collecting, by sound collector 60, of a sound from a predetermined direction even when the plurality of luminaires 70 are off, the plurality of luminaires 70 are caused to emit light of a predetermined brightness before the person enters area 110. It is therefore possible to capture, by camera 50, an image in which presence or absence of a person can be determined. Accordingly, it is possible to completely turn off the plurality of luminaires 70 and to deactivate camera 50 when there is no person in area 110. It is thus possible to save power for the system in which luminaires 70 are turned on or off according to presence or absence of a person in the image of area 110 captured by camera 50.

It should be noted that a lighting system in which a human sensor is used and a plurality of luminaires 70 are caused to emit light of a predetermined brightness when the human sensor detects a person has been developed in order to completely turns off the plurality of luminaires 70 when there is no person in area 110. However, the human sensor has a problem of narrow directivity or false detection due to detecting heat ray. Lighting system 1 is free of such problems as narrow directivity and false detection due to detecting heat ray, and thus has accuracy in human detection higher than the lighting system in which the human sensor is used.

In addition, controller 20 causes, among plurality of luminaires 70, at least one of luminaires 70 disposed in the predetermined direction relative to sound collector 60 to emit light of the predetermined brightness and activates camera 50 when the sound collected by sound collector 60 is determined to be the sound from the predetermined direction.

In this manner, since it is known in advance that a person is moving to area 110, as a result of collecting of a sound from a predetermined direction by sound collector 60, it is sufficient for controller 20 to cause at least luminaire 70 disposed in a predetermined direction relative to sound collector 60 among the plurality of luminaires 70 to emit light of a predetermined brightness. Accordingly, among the plurality of luminaires 70, only luminaire 70 disposed in the predetermined direction relative to sound collector 60 can be caused to emit light, and thus it is possible to further save power in the system in which luminaires 70 are turned on or off according to presence or absence of a person in the image of area 110 captured by camera 50.

Controller 20, after camera 50 is activated, further determines presence or absence of a person in area 110 on the basis of the image of area 110 captured by camera 50, and turns off the plurality of luminaires 70 and deactivates camera 50 when controller 20 determines the absence of a person in area 110.

In this manner, the plurality of luminaires 70 are automatically turned off and camera 50 is deactivated when there is no person anywhere in area 110, and thus it is possible to further save power in the system in which luminaires 70 are turned on or off according to presence or absence of a person in the image of area 110 captured by camera 50.

In addition, the predetermined direction is a direction toward a region of at least one of an entrance and an exit for people in space 100 in which lighting system 1 is installed, relative to sound collector 60.

In general, people often enter space 100 from a region of at least one of an entrance and an exit for people such as door 101 or 102 in space 100. In view of this, since it is often the case that a person does not enter space 100 when sound collector 60 collects a sound from a direction other than the region of at least one of an entrance and an exit for people, it is possible to avoid causing the plurality of luminaires 70 to emit light and avoid activating camera 50. In this manner, it is possible to further save power in the system in which luminaires 70 are turned on or off according to presence or absence of a person in the image captured by camera 50.

In addition, controller 20 determines whether or not the sound collected by sound collector 60 while the plurality of luminaires 70 are off is a sound of a predetermined type from the predetermined direction, and causes at least one of the plurality of luminaires 70 to emit light of the predetermined brightness and activates camera 50 when the sound collected by sound collector 60 is determined to be the sound of the predetermined type from the predetermined direction.

In general, when a person enters space 100, it is often the case that a sound generated when door 101 or 102 is opened or closed, a footstep, etc., which are caused by a person entering or leaving space 100, for example, are generated as a sound of a predetermined type. Accordingly, even when sound collector 60 collects a sound from a predetermined direction, it is often the case that the sound is not a sound caused by a person entering or leaving space 100 if the sound is not a sound of the predetermined type. It is thus possible, in this case, to avoid causing the plurality of luminaires 70 to emit light and to avoid activating camera 50. In this manner, it is possible to further save power in the system in which luminaires 70 are turned on or off according to presence or absence of a person in the image captured by camera 50. In addition, it is possible, by setting the sound of a predetermined type as a sound determined in advance by a person who uses space 100, to prevent the plurality of luminaires 70 from being turned on when a suspicious individual or the like who does not know the sound of the predetermined type enters space 100 without generating the sound of the predetermined type.

In addition, camera 50 and sound collector 60 are included in a single casing 40.

With this configuration, it is possible to suppress the costs of detector 40.

Embodiment 2

Figure 7:
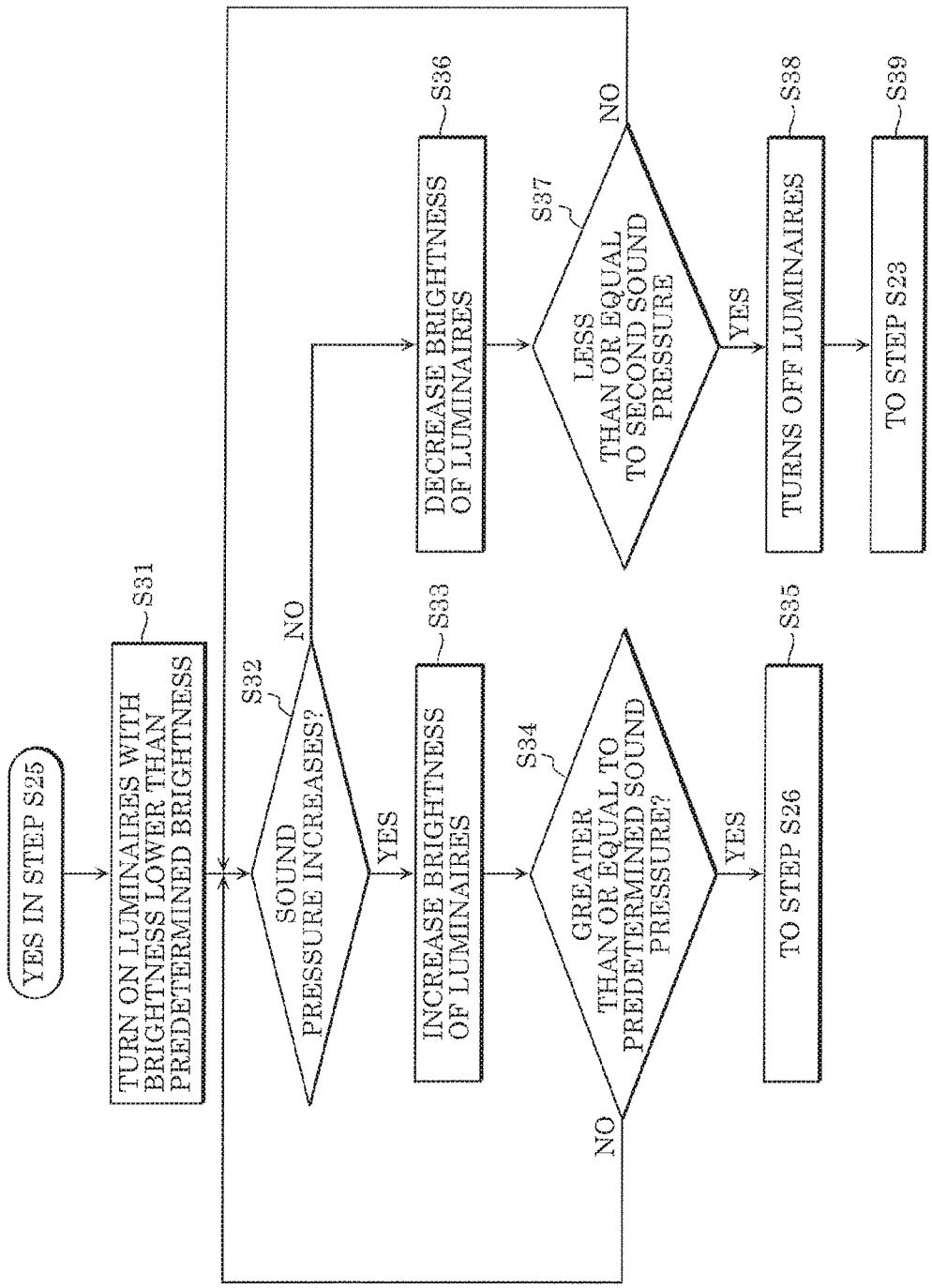
FIG. 7 is a flowchart illustrating an example of an operation of a lighting system according to Embodiment 2.
Figure 8:
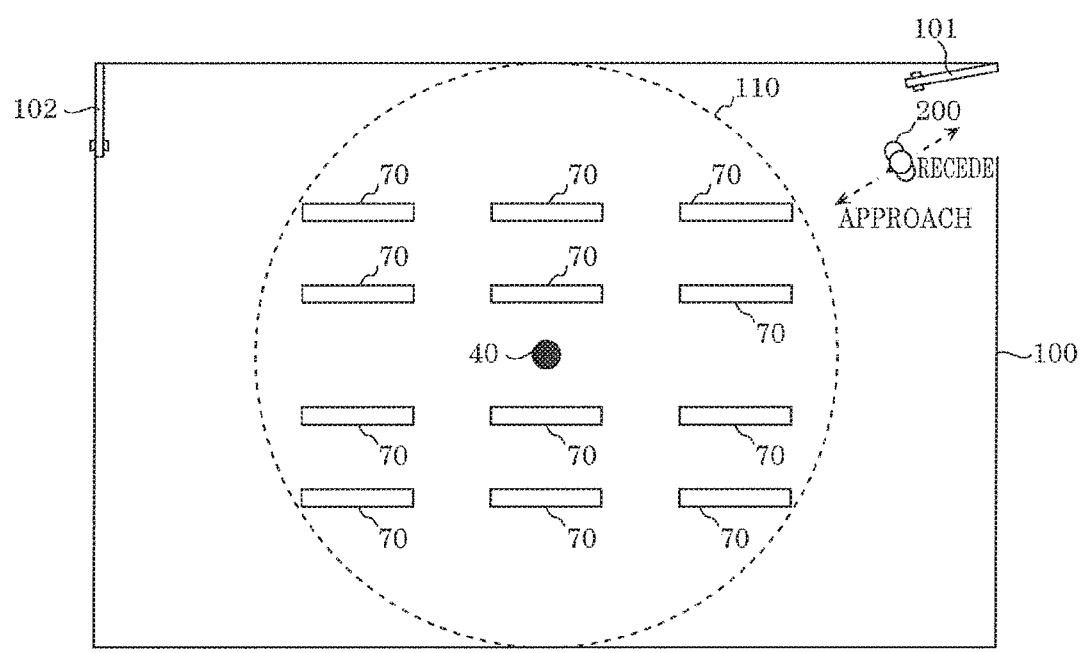
FIG. 8 is an explanation diagram for explaining an operation of the lighting system according to Embodiment 2.

The following describes Embodiment 2 with reference to FIG. 7 and FIG. 8.

FIG. 7 is a flowchart illustrating an example of an operation of lighting system 2 according to Embodiment 2.

It should be noted that, lighting system 2 has a configuration same as the configuration described in Embodiment 1, and thus description of the configuration of lighting system 2 will be omitted. However, sound detector 24 according to Embodiment 2 further detects sound pressure of a sound collected by sound collector 60.

When the process of Step S25 results in Yes, subsequent operations differ between lighting system 2 and lighting system 1. It should be noted that, in the case where processes of Step S24 and Step S25 performed in this order as illustrated in FIG. 6 are performed in the inverse order, the operations subsequent to Step S24 differ between lighting system 2 and lighting system 1 when the process of Step S25 results in Yes.

When comparator 26 determines that the sound collected by sound collector 60 is the sound of the predetermined type (Yes in Step S25) after controller 20 has performed the processes from Step S21 to Step S24, lighting controller 22 causes the plurality of luminaires 70 to emit light of a brightness lower than the predetermined brightness (Step S31). The brightness lower than the predetermined brightness is brightness which is lower than the brightness necessary for capturing, by camera 50, an image in which presence or absence of a person can be determined. In other words, area 110 is dark even when camera 50 is activated, and thus it is difficult to obtain, as a result of capturing area 110 by camera 50, an image in which presence or absence of a person in area 110 can be determined.

Next, sound detector 24 determines whether or not sound pressure of the sound generated when a person moves and collected by sound collector 60 increases (Step S32). The sound generated when a person moves includes, for example, a footstep, rustle of clothes, a sound generated when a carrier is pushed, etc. There are instances where the region of at least one of an entrance and an exit in space 100 and area 110 are distant from each other as illustrated in FIG. 8, when a person enters space 100.

FIG. 8 is an explanation diagram for explaining an operation of lighting system 2 according to Embodiment 2.

According to Embodiment 1, for example, the plurality of luminaires 70 are caused to emit light of a predetermined brightness and camera 50 is activated in response to a sound from the direction of door 101 which is generated when door 101 is opened or closed. However, in the case where the region of at least one of an entrance and an exit (door 101) in space 100 and area 110 are distant from each other as illustrated in FIG. 8, it is not necessary for camera 50 to capture area 110 until person 200 reaches area 110. Accordingly, the plurality of luminaires 70 need not be caused to emit light of a predetermined brightness until person 200 reaches area 110. At this time, whether or not person 200 has reached area 110 is determined according to sound pressure of the sound generated when a person moves. For example, register 25 stores in advance, on storage 30, sound pressure of a sound generated when a person moves, at the time when a person reaches area 110. The sound pressure is determined as a predetermined sound pressure (first sound pressure). In addition, register 25 stores, on storage 30, sound pressure of a sound generated when a person moves, at the time when a person leaves from the region of at least one of an entrance and an exit (door 101) in space 100. The sound pressure is determined as second sound pressure.

When sound detector 24 determines that sound pressure of the sound generated when person 200 moves and collected by sound collector 60 increases (Yes in Step S32), lighting controller 22 increases brightness of the plurality of luminaires 70 (Step S33). It should be noted that the plurality of luminaires 70 may be at least one of luminaires 70. At this time, lighting controller 22 controls brightness of the plurality of luminaires 70 according to a level of the sound pressure detected by sound detector 24.

Next, sound detector 24 determines whether or not the sound pressure of the sound generated when person 200 moves and collected by sound collector 60 is greater than or equal to a predetermined sound pressure (the first sound pressure) (Stop S34). In other words, sound detector 24 determines whether or not person 200 has reached area 110.

When sound detector 24 determines that the sound pressure of the sound generated when person 200 moves and collected by sound collector 60 is not greater than or equal to the predetermined sound pressure (the first sound pressure) (No in Step S34), the processes from Step S32 are repeated. More specifically, the sound pressure of the sound generated when person 200 moves gradually increases (in other words, person 200 approaches area 110) and the processes from Step S32 to Step S34 are performed repeatedly, thereby gradually increasing the brightness of the plurality of luminaires 70 toward predetermined brightness.

When sound detector 24 determines that the sound pressure of the sound generated when person 200 moves and collected by sound collector 60 is greater than or equal to the predetermined sound pressure (Yes in Step S34), the process of Step S26 is performed (Step S35). More specifically, lighting controller 22 causes the plurality of luminaires 70 to emit light of a predetermined brightness, and camera controller 23 activate camera 50.

On the other hand, when sound detector 24 determines that the sound pressure of the sound generated when person 200 moves and collected by sound collector 60 decreases (No in Step S32), lighting controller 22 decreases brightness of the plurality of luminaires 70 (Step S36). At this time lighting controller 22 controls brightness of the plurality of luminaires 70 according to a level of the sound pressure detected by sound detector 24.

Next, sound detector 24 determines whether or not the sound pressure of the sound generated when person 200 moves and collected by sound collector 60 is less than or equal to the second sound pressure (Step S37). In other words, sound detector 24 determines whether or not person 200 has exited from the region of at least one of an entrance and an exit in space 100.

When sound detector 24 determines that the sound pressure of the sound generated when person 200 moves and collected by sound collector 60 is not less than or equal to the second sound pressure (No in Step S37), the processes from Step S32 are repeated. More specifically, the sound pressure of the sound generated when person 200 moves gradually decreases (in other words, person 200 recedes from area 100) and the processes of Step S32, Step S36, and Step S37 are performed repeatedly, thereby gradually decreasing the brightness of the plurality of luminaires 70.

When sound detector 24 determines that the sound pressure of the sound generated when person 200 moves and collected by sound collector 60 is less than or equal to the second sound pressure (Yes in Step S37), lighting controller 22 turns off the plurality of luminaires 70 (Step S38). In other words, it is recognized that person 200 has left space 100, and thus the plurality of luminaires 70 are turned off.

Then, the processes from Step S23 are performed (Step S39).

In this manner, after causing at least one of the plurality of luminaires 70 to emit light of a brightness less than the predetermined brightness when the sound collected by sound collector 60 is determined to be the sound from the predetermined direction, controller 20 (i) increases the brightness of the at least one of the plurality of luminaires 70 toward the predetermined brightness with increasing sound pressure of a sound that is generated when a person moves, and is collected by sound collector 60, and (ii) causes the at least one of the plurality of luminaires 70 to emit light of the predetermined brightness and activates camera 50 when the sound pressure of the sound generated when the person moves is equal to or greater than a predetermined sound pressure.

The plurality of luminaires 70 need not be caused to emit light of a predetermined brightness until person 200 reaches area 110. However, since it is difficult for person 200 to move when space 100 is in darkness, the plurality of luminaires 70 are caused to emit light of a brightness lower than the predetermined brightness until person 200 reaches area 110. In addition, for example, the sound pressure of the sound generated when person 200 moves, such as a footstep of person 200 gradually increases, in other words, person 200 approaches area 110, thereby allowing the brightness of the plurality of luminaires 70 to be gradually increased, i.e., to fade in. When the sound pressure of the sound generated when person 200 moves becomes greater than or equal to the sound pressure of a sound generated when person 200 moves at the time when a person reaches area 110, as a predetermined sound pressure, the plurality of luminaires 70 are caused to emit light of a predetermined brightness and camera 50 is activate, and thus it is possible to capture, by camera 50, an image in which presence or absence of a person in area 11 can be determined. However, since the sound pressure of the sound generated when a person moves (a footstep, etc.) varies among individuals, there are instances where the plurality of luminaires 70 are caused to emit light of a predetermined brightness and camera 50 is activated before the person reaches area 110, or the plurality of luminaires 70 are not caused to emit light of a predetermined brightness and camera 50 is not activated even when the person has reached area 110.

Embodiment 3

Figure 9:
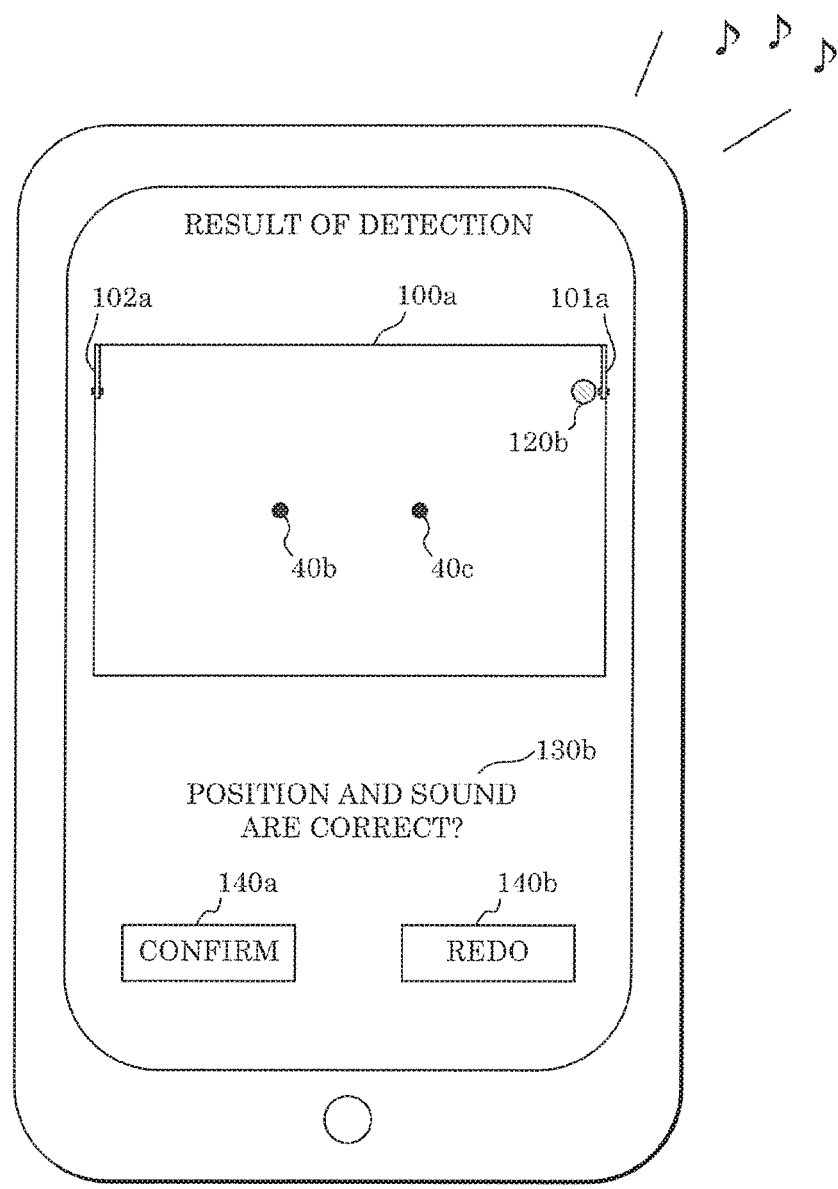
FIG. 9 is a diagram illustrating an example of a display image which a register according to Embodiment 3 causes a tablet terminal to display.

The following describes Embodiment 3 with reference to FIG. 9.

FIG. 9 is a diagram illustrating an example of a display image which register 25 according to Embodiment 3 causes the tablet terminal to display.

Lighting system 3 according to Embodiment 3 includes at least two sound collectors 60. Here, lighting system 3 includes two detectors 40, and the two detectors 40 each include sound collector 60. With this configuration, lighting system 3 includes two sound collectors 60. It should be noted that one of the two detectors 40 need not include camera 50. Other than the above-described components, lighting system 3 has a configuration same as the configuration described in Embodiment 1, and thus description of the other configuration of lighting system 3 will be omitted.

Lighting system 3 includes two sound collectors 60, and thus is capable of recognizing a position at which a sound is generated. More specifically, since a direction of a sound relative to each of sound collectors 60 is recognized, a position at which the directions of the sound intersect is recognized as a position at which the sound is generated. With this configuration, whereas the direction of a sound is registered when the sound is registered according to Embodiment 1, the position of a sound is registered when the sound is registered according to the present embodiment. According to the present embodiment, when a sound is registered, register 25 causes a tablet terminal to display, for example, an image as illustrated in FIG. 9 on a display section. It should be noted that, as with Embodiment 1, it is assumed that, when a sound is registered, a worker generates a sound which is generated when door 101 is opened or closed, and register 25 temporarily registers a position of door 101 as a position of the sound generated by the worker.

As illustrated in FIG. 9, on the display section of the tablet terminal, image 100a indicating space 100 is displayed, and images 40b and 40c indicating two detectors 40 are displayed at positions in image 100a which correspond to positions of the two detectors 40 in space 100.

Register 25 superimposes, on image 100a, image 120b indicating the position of the sound generated by the worker as illustrated in FIG. 9, as a result of temporarily registering the position in proximity to door 101 as the position of the sound generated by the worker. Image 120b is displayed in proximity to image 101a, and thus it is possible for the worker to recognize that the data item indicating a position of a sound to be stored on storage 30 by register 25 is the data item indicating the position in proximity to door 101. In addition, register 25 displays, for example, display image 130b used for confirming that the position and type of the sound to be registered by register 25 are the position of image 120b and a sound being reproduced, and icons 140a and 140b which can be operated by the worker, on the display section of the tablet terminal as illustrated in FIG. 9.

As described above, in lighting system 3, sound collector 60 includes at least two sound collectors 60.

With this configuration, it is possible to also recognize a position at which a sound is generated, in addition to the direction of the sound collected by sound collector 60.

Other Embodiments

A lighting system according to the embodiments has been described thus far. However, the present disclosure is not limited to the above-described embodiments.

For example, controller 20 causes the plurality of luminaires 70 to emit light of a predetermined brightness and activates camera 50 when the sound collected by sound collector 60 while the plurality of luminaires 70 are off is a sound of a predetermined type from a predetermined direction, according to the foregoing embodiments. However, the present disclosure is not limited to this example. For example, the sound from a predetermined direction need not be a sound of a predetermined type. More specifically, controller 20 may cause the plurality of luminaires 70 to emit light of a predetermined brightness and activate camera 50 regardless of the type of a sound, as long as the sound collected by sound collector 60 while the plurality of luminaires 70 are off is a sound from the predetermined direction.

In addition, for example, although sound collector 60 includes two microphones 61 and 62 according to the above-described embodiments, the present disclosure is not limited to this example. For example, sound collector 60 may include three or more microphones.

In addition, for example, although controller 20 includes image recognizer 21 according to the above-described embodiments, the present disclosure is not limited to this example. For example, image recognizer 21 may be included in camera 50.

In addition, for example, although door 101 or 102 is provided as a region of at least one of an entrance and an exit for people in space 100 according to the above-described embodiments, the present disclosure is not limited to this example. For example, the region of at least one of an entrance and an exit for people need not be a region having a partition such as a door. In this case, the sound of the predetermined type may be a footstep, for example.

In addition, the present disclosure can be implemented not only as the lighting system, but also as a method including steps (processes) performed by the structural components included in the lighting system.

For example, these steps may be executed by a computer (computer system). The present disclosure can be implemented as a program for causing the computer to execute the steps included in the method. Furthermore, the present disclosure can be implemented as a non-transitory computer-readable recording medium such as a CD-ROM on which the program is recorded.

For example, when the present disclosure is implemented by a program (software), each step is performed by executing the program using hardware resources such as a CPU, a memory, an input and output circuit, etc., of the computer. In other words, each of the steps is executed as a result of obtaining and computing data from the memory, the input and output circuit, etc. by the CPU, or outputting a result of the computing to the memory, the input and output circuit, etc. by the CPU, for example.

In addition, each of the structural components included in the lighting system according to the foregoing embodiments may be implemented as a dedicated or a general-purpose circuit.

In addition, each of the structural components included in the lighting system according to the foregoing embodiments may be implemented as a large scale integration (LSI) which is an integrated circuit (IC).

Furthermore, the integrated circuit is not limited to the LSI, and may be implemented by a dedicated circuit or a general-purpose processor. A field programmable gate array (FPGA) that is programmable, or a reconfigurable processor that is capable of reconfiguring connection and setting of circuit cells inside an LSI may be used.

Furthermore, when advancement in semiconductor technology or derivatives of other technologies brings forth a circuit integration technology which replaces LSI, it will be appreciated that such a circuit integration technology may be used in circuit integration for each of the structural components included in the lighting system.

It should be noted that the present disclosure also includes other forms in which various modifications apparent to those skilled in the art are applied to the embodiments or forms in which structural components and functions in the embodiments are arbitrarily combined within the scope of the present disclosure.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting system, comprising:
  a plurality of luminaires;
  a camera which captures an image of an area illuminated by the plurality of luminaires;
  a sound collector including at least two microphones; and
  a controller which determines whether or not a sound collected by the sound collector while the plurality of luminaires are off is a sound from a predetermined direction relative to the sound collector,
  wherein the controller causes at least one of the plurality of luminaires to emit light of a predetermined brightness and activates the camera when the sound collected by the sound collector is determined to be the sound from the predetermined direction, and does not cause the plurality of luminaires to emit light of the predetermined brightness or activate the camera when the sound collected by the sound collector is determined not to be the sound from the predetermined direction.

2. The lighting system according to claim 1, wherein the controller causes, among the plurality of luminaires, one or more luminaires disposed in the predetermined direction relative to the sound collector to emit light of the predetermined brightness and activates the camera when the sound collected by the sound collector is determined to be the sound from the predetermined direction.

3. The lighting system according to claim 1, wherein, after the camera is activated, the controller further:
determines presence or absence of a person in the area on the basis of the image of the area captured by the camera; and
turns off the plurality of luminaires and deactivates the camera when the controller determines the absence of a person in the area.

4. The lighting system according to claim 1, wherein the predetermined direction is a direction toward a region of at least one of an entrance and an exit for people in a space in which the lighting system is installed, relative to the sound collector.

5. The lighting system according to claim 1, wherein the controller:
determines whether or not the sound collected by the sound collector while the plurality of luminaires are off is a sound of a predetermined type from the predetermined direction, and
causes the at least one of plurality of luminaires to emit light of the predetermined brightness and activates the camera when the sound collected by the sound collector is determined to be the sound of the predetermined type from the predetermined direction.

6. The lighting system according to claim 1, wherein, when the controller determines that the sound collected by the sound collector is determined to be the sound from the predetermined direction, the controller:
first causes at least one of the plurality of luminaires to emit light of a brightness less than the predetermined brightness, and then
(i) increases the brightness of the at least one of plurality of luminaires toward the predetermined brightness with increasing sound pressure of a sound that is generated when a person moves, and is collected by the sound collector, and
(ii) causes the at least one of the plurality of luminaires to emit light at the predetermined brightness and activates the camera when the sound pressure of the sound generated when the person moves is equal to or greater than a predetermined sound pressure.

7. The lighting system according to claim 1, wherein the camera and the sound collector are included in a single casing.

8. The lighting system according to claim 1, wherein the sound collector comprises at least two sound collectors.

* * * * *